United States Patent

Gupta et al.

[11] Patent Number: 5,531,940
[45] Date of Patent: Jul. 2, 1996

[54] METHOD FOR MANUFACTURING PHOTOCHROMIC LENSES

[75] Inventors: Amitava Gupta, Bethesda, Md.; Ronald D. Blum, Roanoke, Va.

[73] Assignee: Innotech, Inc., Roanoke, Va.

[21] Appl. No.: 165,056

[22] Filed: Dec. 10, 1993

[51] Int. Cl.$^6$ ................................................. B29D 11/00
[52] U.S. Cl. ...................... 264/1.700; 252/586; 264/1.8; 351/163; 427/162
[58] Field of Search ................................ 264/1.1, 1.7, 1.8; 252/586; 351/163; 427/162, 164; 425/808

[56] References Cited

U.S. PATENT DOCUMENTS

| | | |
|---|---|---|
| 3,519,462 | 7/1970 | Bristol et al. . |
| 3,562,172 | 2/1971 | Ono et al. . |
| 3,578,602 | 5/1971 | Ono et al. . |
| 4,116,862 | 9/1978 | Wippler . |
| 4,190,621 | 2/1980 | Greshes ................................ 264/1.8 |
| 4,215,010 | 7/1980 | Hovey et al. . |
| 4,286,957 | 9/1981 | Le Naour-Sene . |
| 4,342,668 | 8/1982 | Hovey et al. ........................ 252/586 |
| 4,544,572 | 10/1985 | Sandvig et al. . |
| 4,637,698 | 1/1987 | Kwak et al. ......................... 252/586 |
| 4,792,224 | 12/1988 | Kwiatkowski et al. ............. 252/586 |
| 4,851,471 | 7/1989 | Maltman et al. .................... 524/719 |
| 4,882,438 | 11/1989 | Tanaka et al. ...................... 548/407 |
| 4,936,995 | 6/1990 | Kwiatkowski ...................... 252/586 |
| 4,960,678 | 10/1990 | Tanaka et al. ...................... 430/332 |
| 4,968,454 | 11/1990 | Crano et al. ........................ 252/586 |
| 5,106,998 | 4/1992 | Tanaka et al. ...................... 549/331 |
| 5,130,058 | 7/1992 | Tanaka et al. ...................... 252/586 |
| 5,147,585 | 9/1992 | Blum . |
| 5,178,800 | 1/1993 | Blum . |
| 5,180,524 | 1/1993 | Casilli et al. ....................... 252/586 |
| 5,219,497 | 6/1993 | Blum . |
| 5,246,989 | 9/1993 | Iwamoto et al. .................... 524/89 |
| 5,349,065 | 9/1994 | Tanaka et al. ...................... 546/15 |

FOREIGN PATENT DOCUMENTS

| | | |
|---|---|---|
| 0134633 | 3/1985 | European Pat. Off. . |
| 0141407 | 5/1985 | European Pat. Off. . |
| 0245020 | 11/1987 | European Pat. Off. . |
| WO85/02619 | 6/1985 | WIPO . |

Primary Examiner—Mathieu D. Vargot
Attorney, Agent, or Firm—Kenyon & Kenyon

[57] ABSTRACT

Methods for making optical quality plastics lenses with photochromic additives are described. According to a first embodiment of the invention, a casting resin is containing photochromic additives is arranged between a mold and a lens preform and then cured. According to a second embodiment of the invention, a casting resin substantially free of photochromic additives is arranged between a mold and a lens preform and then cured. The resin is then impregnated with photochromic additives. In a third embodiment, a layering resin containing a photochromic additive is provided on the surface of a mold and cured to a gel state. Then, a casting resin that is substantially free of photochromic additives is arranged between the coated mold and a lens preform and cured. According to a fourth embodiment, a casting resin that is substantially free of photochromic additive is provided on the surface of a mold and cured to a gel state. Then, a casting resin containing photochromic additives is arranged between the coated mold and a lens preform and cured.

16 Claims, 3 Drawing Sheets

METHOD FOR MANUFACTURING PHOTOCHROMIC LENSES

FIELD OF THE INVENTION

The present invention relates to plastic, optical quality lenses containing photochromic additives and to methods for quickly and inexpensively producing such lenses.

BACKGROUND OF THE INVENTION

In manufacturing lenses, and particularly lenses for eyeglasses, the use of plastics is often desirable due to their light weight and durability. Plastic lenses also provide relatively economic vision correction. Methods for producing plastic lenses of various prescriptions are well known.

As used herein a "plastic" lens is one fashioned from optical quality resin materials. Standard industrial materials for use in plastic lenses include mixtures containing allyl diglycol carbonates. Other optical quality resin materials which show promise are polycarbonates of bisphenol A.

Photochromic additives are typically provided by techniques that entail for example, dipping plastic lenses into a heated solution that contains a photochromic additive dissolved in an organic solvent (such as methanol, cyclohexane and methyl ethyl ketone) at a predetermined elevated temperature and for a predetermined time. Many lens materials, however, cannot be provided with photochromic additives using such techniques. For example, CR-39, sold by PPG Industries cannot be used in connection with such techniques. Instead, only a relatively few materials which form soft materials with low cross link density can be used. The most common of such resins is CR-307, which is sold by PPG Industries.

More importantly, the above techniques for providing plastic lenses with photochromic additives are expensive and time-consuming. Such methods are disadvantageous in that substantial quantities of hazardous materials must be purchased, stored and properly disposed of; in that a substantial investment in handling equipment must be made; and in that lenses must be shipped back and forth between photochromic processors and small lensmaking operations (that cannot afford the significant capital investment required for providing photochromic additives using current technology).

Accordingly, there is presently a need in the lensmaking art for a process wherein finished lenses containing photochromic additives can be quickly and inexpensively manufactured by small lensmaking operations. Moreover, there is a need for a method wherein photochromic additives can be used in connection with advantageous optical quality resin materials such as allyl diglycol carbonates.

SUMMARY OF THE INVENTION

Applicants have provided a quick, inexpensive method for incorporating photochromic additives into a wide variety of lens materials, including allyl diglycol carbonates.

According to a first preferred embodiment, the following are provided: a) a finished or semifinished plastic lens preform having a first convex surface that is spherical or aspheric in geometry; b) a mold having a molding surface, at least a portion of which has a profile substantially matching the convex surface of the plastic lens preform; and c) an uncured resin that has a low cross link density and forms a soft matrix upon curing. After providing these materials, the uncured resin, the plastic lens preform and the mold are arranged such that the uncured resin is disposed between convex surface of the plastic lens preform and the molding surface of the mold. Then, the uncured resin composition is cured. Finally, the composite plastic lens is impregnated with a photochromic material.

This first preferred embodiment can be used to construct a composite plastic optical quality lens or a semifinished blank that includes a plastic lens preform and a cured plastic attached portion that contains a photochromic material. The cured plastic attached portion is bonded to the convex surface of the plastic lens preform.

According to a second preferred embodiment, the following are provided: a) a finished or semifinished plastic lens preform having a first convex surface that is spherical or aspheric in geometry; b) a mold having a molding surface, at least a portion of which has a profile substantially matching the convex surface of the plastic lens preform; and c) a photochromic-additive-containing uncured resin that has a low cross link density and forms a soft matrix upon curing. After providing these materials, the uncured resin, the plastic lens preform and the mold are arranged such that the uncured resin is disposed between the convex surface of the plastic lens preform and the molding surface of the mold. Finally, the uncured resin composition is cured to form a cured plastic attached portion that is bonded to the convex surface of the plastic lens preform.

This second preferred embodiment can be used to construct a composite plastic optical quality lens or a semifinished blank that includes a plastic lens preform and a cured plastic attached portion that contains a photochromic material. The cured plastic attached portion is bonded to the convex surface of the plastic lens preform.

According to a third embodiment of the invention, the following are provided: a) a finished or semifinished plastic lens preform having a convex surface that is spherical or aspheric in geometry; b) a mold having a molding surface, at least a portion of which has a profile substantially matching the convex surface of the plastic lens preform; c) a photochromic-additive-containing first uncured resin that has a low cross link density and forms a soft matrix upon curing; and d) a second uncured resin that has a relatively high cross link density and forms a highly scratch resistant matrix upon curing, the second uncured resin being substantially free of photochromic additives and having a lower viscosity than the first curable resin. After providing these materials, a layer of the first uncured resin is applied to the molding surface of the mold and cured to a gel stage to form a coated mold. Then, the second uncured resin, the plastic lens preform and the coated mold are arranged such that the second uncured resin is disposed between the convex surface of the plastic lens preform and the first resin on the coated mold. Finally, a cure step is performed to form a cured plastic attached portion that is bonded to the convex surface of the plastic lens preform and has a thin photochromic layer on its external surface.

This third preferred embodiment can be used to construct a composite plastic optical quality lens that includes a plastic lens preform, a first cured plastic attached portion that has a high cross link density, and a second cured plastic attached portion that has a low cross link density, contains a photochromic material, and is provided in a substantially uniform nonprescription layer. The first cured plastic attached portion is bonded to the convex surface of the plastic lens preform. The second cured plastic attached portion is bonded to the first cured plastic attached portion.

According to a fourth preferred embodiment, the following are provided: a) a finished or semifinished plastic lens preform having a convex surface that is spheric or aspheric in geometry; b) a first uncured resin that has a low cross link density and forms a soft matrix upon curing, the first uncured resin comprising a photochromic additive; c) a second uncured resin that has a relatively high cross link density and forms a highly scratch resistant matrix upon curing, the second uncured resin being substantially free of photochromic additives and having a lower viscosity than the first curable resin composition; and d) a mold having a molding surface, at least a portion of which has a profile substantially matching the convex surface of the plastic lens preform. Once these materials are provided, the second uncured resin, the coated plastic lens preform and the mold are arranged such that the second uncured resin is disposed between the convex surface of the plastic lens preform and the molding surface of the mold. Then, the second uncured resin is cured to a gel state. The first plastic lens preform is subsequently removed from the mold, leaving the second resin that has been cured to a gel state on the mold to form a coated mold. Then, the first uncured resin, the plastic lens preform and the coated mold are arranged such that the first uncured resin is disposed in a thin nonprescription layer between the convex surface of the plastic lens preform and the second resin in the coated mold. Finally, a cure step is conducted.

This fourth preferred embodiment can be used to construct a composite plastic optical quality lens that includes a plastic lens preform, a first cured plastic attached portion that has a high cross link density, and a second cured plastic attached portion that has a low cross link density, contains a photochromic material, and is provided in a substantially uniform nonprescription layer. The second cured plastic attached portion is bonded to the convex surface of the plastic lens preform. The first cured plastic attached portion is bonded to the second cured plastic attached portion.

The above methods are advantageous in that a composite lens containing photochromic additives can be quickly and easily produced by small lensmaking operations.

The above methods are also advantageous in that they can be used to provide photochromic additives in connection with advantageous optical quality resin materials such as allyl diglycol carbonates.

Various other advantages of the methods of the present invention and lenses made thereby will be evident from the detailed description of certain embodiments below.

BRIEF DESCRIPTION OF THE FIGURES

The relative thickness of various components is greatly exaggerated in the Figures for the purpose of illustration.

DETAILED DESCRIPTION OF THE INVENTION

A method for making finished photochromic lenses, which may be spherical or aspheric in geometry and may be monofocal, bifocal, multifocal or progressive in optical characteristics, and photochromic semifinished lens blanks, which have no limitations as to the geometry of the concave surface, is described below. The method utilizes the following: a mold having a molding surface; one or more curable resin compositions; and a finished or semifinished plastic lens preform.

Typical materials for molds in accordance with the present invention include glass molds, such as those made from Crown glass, and metal molds, such as those made from electroformed nickel. However, practically any material can be used so long as the material provides for proper wetting characteristics with respect to the uncured resin compositions, provides for proper release characteristics after the resin composition has been cured, and is compatible with the specific cure process utilized. Preferred mold materials for the practice of the present invention are glasses or plastics transparent to ultraviolet light in the range of 320 to 400 nm. Means for making appropriate molds and for fashioning such molds for use in accordance with the present invention are well known in the art.

The particular lens preform material selected for a specific application will depend upon a number of factors including adherence to the adjacent resin layer, refractive index, the type of cure to be employed, scratch resistance, chromatic aberration, impact resistance, and so forth. The lens preform can be provided in finished or semi-finished form.

Depending upon the application, a great many lens preforms are available. Preferred materials for use as lens preforms include mixtures containing allyl diglycol carbonates (such as bisallyl diethylene glycol carbonate, commercially sold as "MasterCast 1" and "MasterCast 2" by Vision Sciences, Monrovia, Calif.; and as "CR-39" by PPG Industries); polycarbonates such as bisphenol A polycarbonates; polyurethanes; polyesters including polyesters formed of ethylene glycol maleate; acrylic esters; allylic esters such as triallyl cyanurate, triallyl phosphate, triallyl citrate and diallyphenyl phosphonate; polymers formed from styrenic and vinyl monomers; acrylates; methyl, allyl and butyl methacrylates; and other liquid monomer/polymer materials having high indices of refraction.

More preferred materials include bisphenol A polycarbonates; polycarbonates made from chloro, bromo, phenoxy and alkoxy substituted phenols or naphols; and polymers of one or more monomers selected from the group consisting of aliphatic and aromatic acrylate monomers, urethane monomers, ester monomers, styrene monomers, vinyl monomers and allyl monomers.

In some embodiments of the invention, the lens preform itself is impregnated with one or more photochromic additives. Since many lens making operations do not have the equipment to impregnate lens preforms and since many lens preform materials cannot be impregnated using conventional techniques, such lens preforms are typically bought in a pre-impregnated state. Such lenses can be obtained from American Optical, Silor, Sola, Roden-Stock and other lens manufacturers.

As used herein, "lens preform" is a plastic finished or semifinished single vision lens with a spherical or aspheric convex surface, without any limitations on the geometry of the convex surface, herein referred to as the casting surface. If the casting or layering resin used in making the photochromic lenses of the present invention are polymerized photochemically, then the lens preform is preferably transparent to ultraviolet radiation. A single vision lens is a lens with a specific spherical or aspheric curve on the convex surface, and may have a toric or non toric curve on the concave surface, as required.

In casting resin layers on the convex surface of a single vision lens or a semifinished blank, it is preferable to match the surface energy of the polymerizable resin to the surface energy of the casting surface of the lens or blank, so as to assure wetting of the surface of the lens or blank by the polymerizable resin, leading to rapid spreading of the resin on the surface of the lens or blank. As a result, the resin forms a uniform layer on the surface of the lens or blank, and develops a strong and permanent bond to the lens or blank upon completion of cure.

As used herein, a "casting resin" is a resin having surface energy such that the resin readily coats the lens preform and the mold surface (whether coated with a layering resin or uncoated), while having a viscosity such that the resin easily flows within and fills the space between the mold and the preform lens. A "layering resin" also has a surface energy such that the resin readily coats the mold, but it has a much higher viscosity than the casting resin such that the resin adheres to the mold with a minimal tendency to run off of the vertical surfaces of the mold over period of a few minutes.

For example, the layering resins of the present invention preferably have a viscosity of about 100 to 1000 centipoise, more preferably about 150 to 300 centipoise. In contrast, the casting resin compositions of the present invention preferably have a viscosity of about 10 to 50 centipoise, more preferably about 15 to 40 centipoise. Resin viscosity can be increased, for example, by increasing concentration of high molecular weight monomers relative to low molecular weight monomers, and vice versa. Other methods of varying viscosity include addition of thickeners.

The surface energy of a given resin mixture relates to the contact angle between the resin and a given surface, which in turn relates to the degree of adhesion between the resin and the surface. Methods of formulating resin mixtures in order to achieve a certain surface energy (on surface tension) so that the resin develops a certain contact angle with, for example, a hydrophobic plastic single vision lens or, for example, a hydrophilic glass-surfaced mold is well known in the art. For example, Polymer Handbook, J. Bandrup and E. H. Immergut Eds., 3rd Edition, Wiley Interscience Publishers, 1989, the disclosure of which is hereby incorporated by reference, provides detailed information concerning the relationship between surface tension, surface energy, solubility parameters and polar/non-polar characteristics of liquids, including polymerizable monomers such as those used in connection with the present invention.

For example, one typical way of varying the contact angle of a polymerizable resin with respect to a given surface is to vary the relative proportion of two monomers in the resin with differing hydrophobic/hydrophilic character. By adding more hydrophobic monomer, the resin will interact more strongly with a hydrophobic surface and the contact angle will decrease with respect to that surface. Adding more hydrophobic monomer will also cause the resin to interact less strongly with a hydrophilic surface and the contact angle will increase with respect to that surface. Conversely, by adding more hydrophilic monomer, the resin will interact less strongly with a hydrophobic surface and the contact angle will consequently increase with respect to that surface. Adding more hydrophilic monomer will also cause the resin to interact more strongly with a hydrophilic surface and the contact angle will decrease with respect to that surface.

Another typical way of varying the contact angle of a polymerizable resin with a given surface is to add varying amounts of a surfactant such as sodium dodecyl sulfate.

Using such methods, casting resin compositions are preferably formulated to achieve a contact angle between the casting resin and the lens preform of from about 20 degrees to about 45 degrees; a contact angle h between the casting resin and the mold surface (if such contact is established) of from about 45 to about 75 degrees; and a contact angle between the casting resin and layering resin (if such contact is established) of from about 0 to 40 degrees. Similarly, layering resin compositions (if used) are preferably formulated to achieve a contact angle between the layering resin and the mold surface of from about 45 to about 75 degrees.

The particular resin compositions used in connection with the invention will depend upon a number of factors including surface energy, viscosity, the type of cure to be employed, scratch resistance, chromatic aberration, impact resistance, refractive index, and so forth.

Layering and casting resin formulations intended to incorporate photochromic additives preferably have a low cross link density and form a soft matrix upon polymerization, in order to allow rapid impregnation of the photochromic additive if the layer is impregnated after being cured, and also to allow rapid switching of the photochromic material from the dark state to the clear state upon exposure to sunlight. The rate of switching, critical to the performance and consumer acceptance of photochromic lenses, is dependent on the hardness of the matrix incorporating the photochromic additive. Resin layers which develop soft matrices with low cross link density are generally unsuitable as the outermost layer of photochromic lenses, because they are easily scratched or marred during daily use. Therefore resin layers incorporating photochromic additives are preferably overcoated with a hard, scratch resistant outermost layer. The manufacturing process may also be designed so that the photochromic layer lies underneath a hard prescription layer which is scratch resistant. The monomers and oligomers for use in formulating casting and layering resins can be divided into two groups—Group A and Group B. Group A is preferred for hard scratch resistant outermost layers, and Group B is preferred for incorporation of photochromic additives.

Group A monomers and oligomers preferably include mono, di, tri, tetra and pentafunctional acrylates, such as alkoxylated acrylates derived from di or trimethylol alkanes or pentaerethrytol marketed by Sartomer or Polysciences; methacrylates; vinyl monomers such as styrene; allyl monomers such as HIRI, CR-39 and CR-307 marketed by PPG Industries; epoxies, urethanes or esters terminated with acrylic groups; thermal polymerization initiators including peroxides and azo alkanes such as azoisobutyronitrile (AIBN) marketed by DuPont; photochemical initiators, including derivatives of acetophenone and benzophenone such as Irgacure 184 and Irgacure 500 marketed by Ciba Geigy or Durcure 1173 marketed by Radcure Corporation; thickeners such as powdered silica or low molecular weight polymers such as Polymethyl methacrylate or copolymers of methyl methacrylate and allyl methacrylate marketed by PPG Industries; and surface energy controlling agents such as acrylates and methacrylates capable of forming zwitterionic species.

Group B includes all components listed in Group A, with the limitation that no polymerizable component has a functionality of greater than two.

The above resin compositions and lens preforms preferably have refractive indexes of about 1.49 to 1.66, with the refractive index of the resin compositions and lens preform matched within about 0.05 units of one another.

Preferred curable optical quality resin compositions for use as casting resins and layering resins include those compositions comprising: (1) a bisallyl carbonate and (2) a methacrylate, a multi-functional acrylate, or a combination of methacrylate and multi-functional acrylate.

Preferred bisallyl carbonates for use in the above resin compositions include diethylene glycol bisallyl carbonate and bisphenol A bisallyl carbonate (sold as "CR-39" by PPG Industries) and bisphenol A bisallyl carbonate (sold by PPG Industries as HIRI), with CR-39 being more preferred.

Preferred acrylates include multi-functional acrylates, including diacrylates, triacrylates, tetraacrylates and pentaacrylates such as diethylene glycol diacrylate, ethoxylated trimethylol propane triacrylate, pentaerythritol tetraacrylate, and dipentaerythritol pentacrylate. These materials can be obtained, for example from Sartomer.

The preferred methacrylate is bisphenol A methacrylate, sold, for example, by Sartomer.

The casting and layering resin compositions of the present invention also preferably include a thermal initiator (such as diisopropyl peroxydicarbonate, sold by PPG as IPP, a ultraviolet initiator (such as 2-hydroxy-2-methyl-1-phenyl-propan-1-one or 1-hydroxycyclohexylphenyl ketone, sold by Ciba Geigy as Irgacure 182 and Durcure 1173, or both. Photoinitiators are preferred for the practice of the present invention, specifically Durcure 1173.

Depending on the specific embodiment, either the casting resin or the layering resin composition may contain a photochromic additive. Preferred photochromic additives include pyrans and oxazoles.

According to a preferred embodiment, the layering resin compositions comprise about 0.01 to 20 weight % photochromic additives; about 0.5 to 8 weight % photoinitiator; about 25 to 85 weight % bisallyl carbonate; and about to weigh % monofunctional or difunctional acrylates with a range of molecular weights needed to achieve an appropriate overall viscosity, for example, the more preferred viscosity of about 150 to 300 centipoise. More preferably, the layering resin compositions comprise about 0.1 to 5 weight % photochromic additives; about 2 to 4 weight % photoinitiator; about 25 to 50 weight % bisallyl carbonate; and remaining concentration of difunctional acrylates such as oligomeric urethanes terminated with acrylate groups.

Similarly, preferred casting resin compositions comprise about 0.5 to 8 weight % photoinitiator; about 25 to 85 weight % bisallyl carbonate; and % methacrylate, a multi-functional acrylate or a mixture of methacrylate and a multi-functional acrylate. More preferred casting resin compositions comprise about 1 to 4 weight % photoinitiator; about 50 to 80 weight % bisallyl carbonate; and % methacrylate, a multi-functional acrylate or a mixture of methacrylate and a multi-functional acrylate.

Using the principles associated with FIGS. 1A to 5B to follow, a myriad of lens configurations can be constructed from the molds, resins and lens preforms of the present invention, including monofocal, bifocal, multifocal or progressive lenses of spherical or aspheric geometry. It will also be clear that the resin portion can be applied to the front lens surface, the back lens surface or both using the methods of the present invention. In addition, convex or concave surfaces can be treated.

Figure 1A:
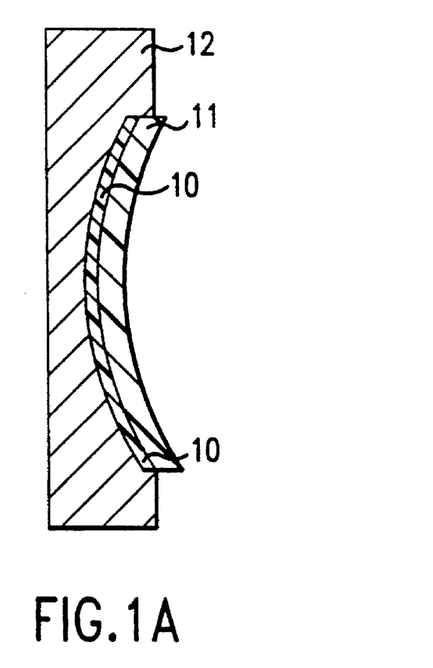
FIG. 1A is a cross-sectional view of an assembly comprising a mold, a casting resin and a single vision lens, in accordance with an embodiment of the present invention.

Referring now to FIG. 1A, a non-prescription photochromic carrier layer 10 comprised of a photochromic-additive-containing casting resin from Group B is arranged between a single vision mold 12 and a single vision lens 11. The curvature of the concave surface of the mold 13 is preferably matched to the convex curvature of the single vision lens 11, such that the photochromic carrier layer 10 will be of substantially uniform thickness. Moreover, the photochromic carrier layer 10 is preferably thin (about 0.025 to 1.0 mm) to promote rapid curing and decrease the probability of developing stress and distortion in the resulting finished lens. The carrier layer 10 is subsequently cured.

Figure 1B:
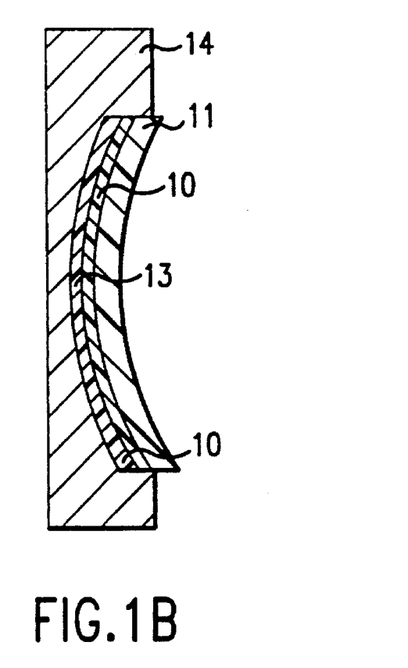
FIG. 1B is a cross-sectional view of an assembly comprising a mold, a coated single vision lens and a casting resin in accordance with the present invention.

Referring now to FIG. 1B, a casting resin from Group A that is substantially free of photochromic additives is arranged in the form of a carrier layer 13 between a single vision mold 14 and the single vision lens 11 with non-prescription photochromic carrier layer 10 from FIG. 1A. The curvature of the concave surface of the single vision mold 14 is preferably matched to the convex curvature of the carrier layer 10, such that the carrier layer 13 will be of substantially uniform thickness. The carrier layer 10 is preferably thin (about 0.025 to 1.0 mm) to promote rapid curing and decrease the probability of developing stress and distortion in the resulting finished lens. The carrier layer 13 is then cured to produce a lens with rapid switching of the photochromic material, while exhibiting good scratch resistance.

Figure 2:
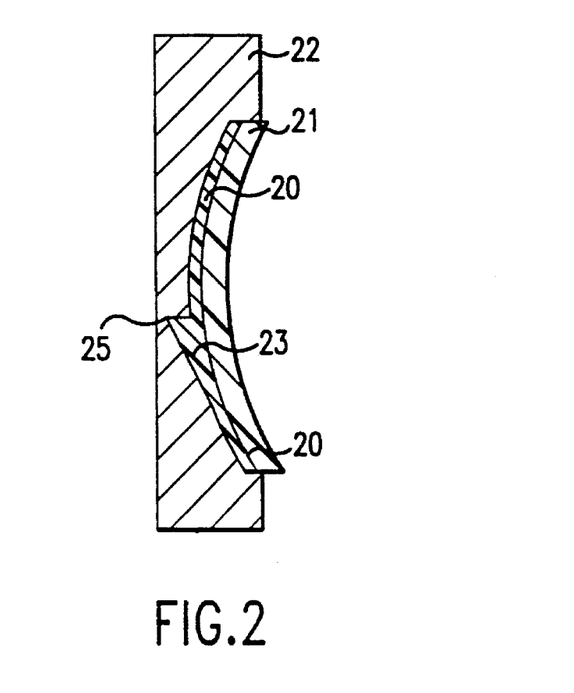
FIG. 2 is a cross-sectional view of an assembly comprising a mold, a casting resin and a single vision lens, in accordance with an embodiment of the present invention.

Referring now to FIG. 2, a bifocal mold 22 with cavity 25, a single vision lens 21, and a resin from Group B that is substantially free of photochromic additives are arranged such that a bifocal segment 23 with adjacent carrier layer 20 is formed between the mold 22 and lens 21. The Group B resin is then cured. The cured resin is then impregnated with a photochromic additive to produce a photochromic lens with rapid switching of the photochromic material. Impregnation with a photochromic additive can be accomplished by immersing the lens in a solution of the photochromic additive for an extended period of time, or by spin coating a solution of the photochromic additive on the convex surface of the lens and subsequently drying off the solvent by heat, thus annealing the coated lens. If desired, the lens may be over coated with a group A resin, which is then cured to promote scratch resistance.

Figure 3A:
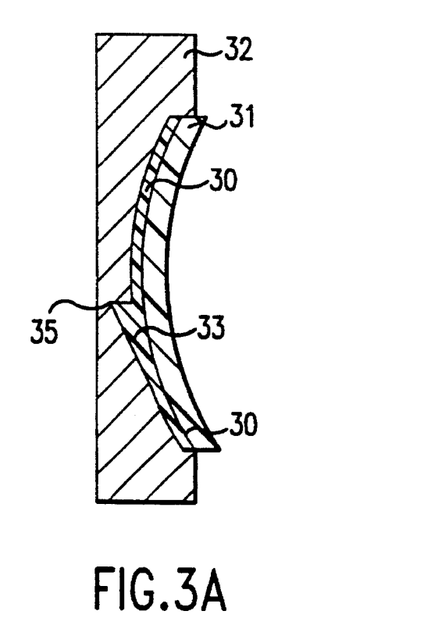
FIG. 3A is a cross-sectional view of an assembly comprising a mold, a casting resin and a single vision lens, in accordance with an embodiment of the present invention.

FIG. 3A illustrates an arrangement of a bifocal mold 32 with cavity 35, a single vision lens 31, and a resin from Group A that is substantially free of photochromic additives are arranged such that a bifocal segment 33 with adjacent carrier layer 30 is formed between the mold 32 and lens 31.

Figure 3B:
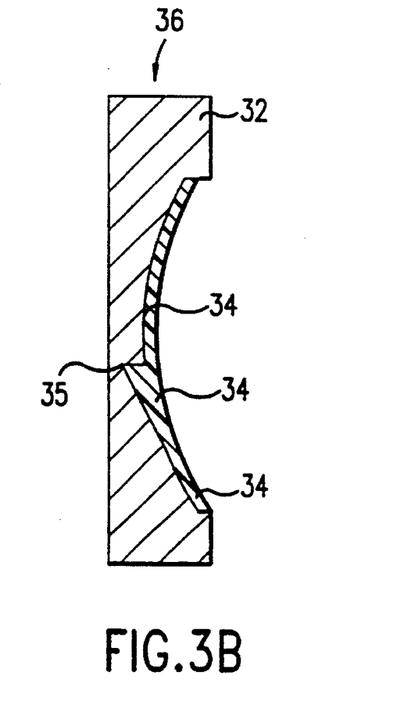
FIG. 3B is a cross-sectional view of a coated mold in accordance with the present invention.

The Group A resin is then cured to a gel state and the lens 31 removed, leaving behind the resin cured to a gel state 34 and forming a coated mold 36 as shown in FIG. 3B.

Figure 3C:
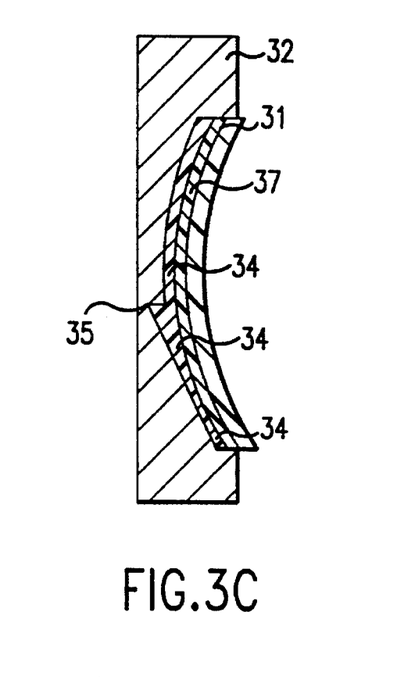
FIG. 3C is a cross-sectional view of an assembly comprising a coated mold, a single vision lens and a casting resin in accordance with the present invention.

Referring now to FIG. 3C, the coated mold from FIG. 3B, a casting resin from Group B containing a photochromic additive, and single vision lens 31 are arranged to form a carrier layer 37 between the single vision lens 31 and the bifocal mold 32 coated with resin cured to a gel state 34. Since the single vision lens 31 was used to produce the coated mold, the curvature of the concave surface of the coated mold is matched to the convex curvature of the single vision lens 31. The carrier layer 37 is preferably thin (about 0.025 to 1.0 mm) to promote rapid curing and decrease the probability of developing stress and distortion in the resulting finished lens. The carrier layer 37 and resin cured to a gel state 34 are then fully cured to produce a lens with rapid switching of the photochromic material, while exhibiting good scratch resistance.

In the embodiments shown in FIGS. 4A, 4B, 5A and 5B, a layering resin composition that contains a photochromic additive is coated on the surface of the mold and partially cured to a gel state so that flow is arrested and the coating remains stable. Then, a casting resin composition that is substantially free of photochromic additives is provided between the coated mold and a lens preform.

Figure 4A:
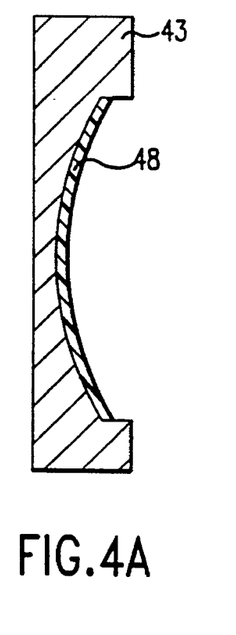
FIGS. 4A and 5A are cross-sectional views of assemblies comprising a mold coated with a layering resin, in accordance with the present invention.

Referring now to FIG. 4A, a layering resin composition from Group B containing a photochromic additive is provided in a nonprescription thin coat 48 on the molding surface of a mold 43. The thin coat 48 is preferably about 0.2 to 0.3 mm (200 to 300 μm) in thickness. This thin coat 48 is then cured to a gel state, for example, using a short burst of ultraviolet radiation.

Figure 4B:
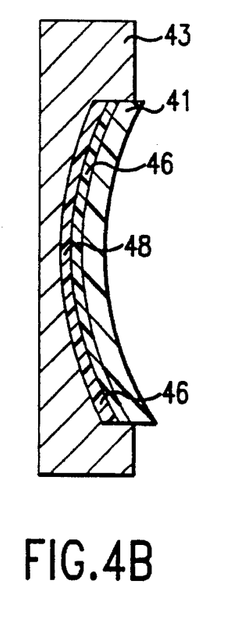
FIGS. 4B and 5B are cross-sectional views of assemblies comprising a coated mold, a casting resin and a lens preform, in accordance with the present invention.

Referring now to FIG. 4B, a casting resin composition from Group A or B that is substantially free of photochromic additives is then provided in the form of a layer 46 between lens preform 41 and the thin coat 48 in a gel state. As above, the layer 46 is preferably provided in a thin, uniform layer.

Figure 5A:
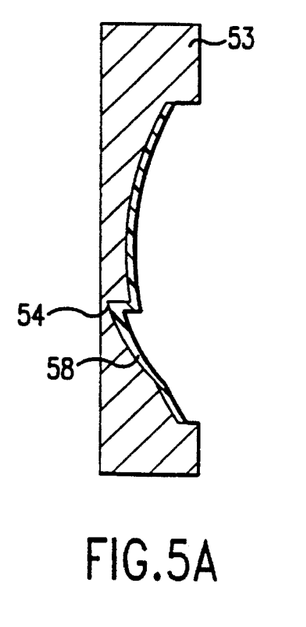

Referring now to FIG. 5A, if an added prescription segment, such as a bifocal segment, is to be added, then a cavity 54 can be established in the mold 53. A layering resin composition from Group B containing a photochromic additive can then be provided in a thin coat 58 on the molding surface of the mold 53, including the surfaces of cavity 54. The thin nonprescription coat 58 is then cured to a gel state, for example, using a short burst of ultraviolet radiation.

Figure 5B:
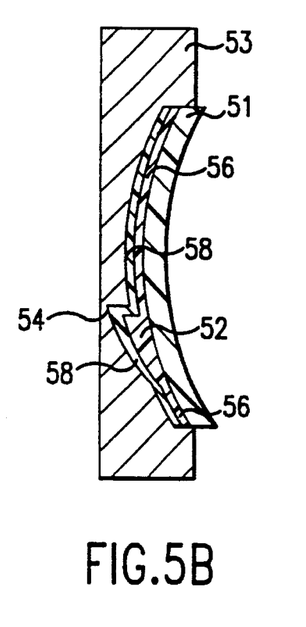

Referring now to FIG. 5B, the mold 53 with thin coat 58, a lens preform 51, and a casting resin composition from Group A or B which is substantially free of photochromic additives are arranged such that the casting resin composition is disposed between the lens preform 53 and the thin coating 58. As a result, the casting resin composition takes the form of a non-prescription carrier layer 56 and a prescription segment 52. As above, the carrier layer 56 is sufficiently thin and uniform to ensure that the carrier layer 56 does not change the distance prescription of the lens preform in the area adjacent to the bifocal segment 52.

The embodiments discussed in connection with FIGS. 4A to 5B produce a photochromic lens with rapid switching of the photochromic material. If desired, the photochromic lens can be over coated with an additional group A resin which is then cured to promote scratch resistance.

Although the above embodiments shown in connection with FIGS. 1A to 5B are used in connection with finished single vision lens, it should be understood that the various embodiments can also be practiced, for example, with single vision semifinished blanks. Similarly, although the above embodiments make use of either single vision molds or bifocal molds, it should be understood that these molds can be either spherical or aspheric, and can be single vision, bifocal, trifocal, multifocal, progressive, and so forth.

In other embodiments, the surface of the lens preform can be altered for the purpose of, for example, converting the casting surface into a progressive lens surface; providing a seamless multifocal, bifocal or trifocal lens surface; or in case of preforms comprising single vision lenses, inducing prismatic effects in the finished lens. The methods of the present invention can also be used to properly orient the optical center of the lens with respect to the multifocal or progressive region. Also they can be used to cast compensating base-down prism in conjunction with casting a progressive lens. In some lens designs, adjustments must be made to accommodate astigmatism in the prescription of the finished resulting lens. Additional details enabling one skilled in the art to practice such embodiments are described, for example, in U.S. Pat. No. 5,219,497, the disclosure of which is hereby incorporated by reference.

According to a preferred embodiment for the practice of the invention, the casting resin is placed onto the mold prior to assembly of the mold and lens preform.

Once the above lens preforms, uncured casting resins, gelled layering resins (if any) and molds are assembled, the assemblies are subjected to a cure step. During curing, the mold and lens preform may be held together, among other means, by peripheral clamping around the extreme periphery of the lens preform and the mold, by a conventional optical gasket which holds the lens preform and mold together, by the force provided by the weight of the lens preform when it is placed on top of the mold, by capillary attraction resulting from a very thin film of resin material between the mold and lens preform (i.e., the carrier layer), or by a combination thereof.

Preferred embodiments of the present invention, however, do not require use of a conventional optical gasket. This promotes more versatile and flexible casting and makes such methods significantly more economical than traditional casting methods which employ conventional optical gaskets. In some such embodiments, for example, casting resin is dispensed into the mold, without the use of conventional optical gaskets. Then, the lens preform is placed on top of the casting resin, and the weight of the lens presses casting resin out of the mold until the surface of the lens is separated from the mold by a thin carrier layer of casting resin. The mold and lens preform are held together by capillary attraction of the casting resin layer, by weight and/or by other means. In this manner, a thin carrier layer of material is cast over the surface of the lens preform, in addition to any segment or other optic surface defined by the mold, without the use of a conventional optical gasket.

The casting method of the present invention may comprise placing a specified volume of polymerizable resin in the mold, placing tapes or other flexible and compressible means at the edge of the mold in a manner sufficient to provide at least partial support for the weight of, for example, a semifinished blank (but not so extensive as to provide a complete enclosure around the periphery of the mold), subsequently placing the semifinished blank on the resin in the mold with its convex surface in contact with the resin, the weight of the blank causing the resin to spread out and the tapes or other compressible means to become partially compressed and thus providing a counterforce to at least partially support the weight of the semifinished blank. The tape or other compressible means become further compressed as needed as the cure proceeds and the resin layer undergoes shrinkage. Whether tapes are needed or not will depend on the weight of the blank.

During cure, the various resin materials the mold and lens preform is cured to harden and bond with each other and the lens preform surface. At the same time, the various resin materials can be separated from the mold.

The casting and layering resins may be cured in any manner appropriate for the composition of such materials. Thermal and ultraviolet curing methods are preferred, however, because most materials can be readily cured by exposure to heat or ultraviolet radiation, with ultraviolet curing being most preferred. Other curing methods include without limitation ultrasound, infrared, microwave and other forms of radiation.

Ultraviolet curing is typically achieved in connection with a ultraviolet light source. Suitable ultraviolet light sources include those manufactured by Phillips Corporation and identified as TL/10R/UVA reflector lamps, HPM high pressure halide lamps, HPA medium pressure metal halide lamps and HPR high pressure mercury vapor lamps. Typically, the resin is exposed to a ultraviolet source (i.e., a source emitting radiation in the range of about 300–450 nm) during the curing process until the resin sufficiently hardens (i.e., approximately 5–30 minutes). Many photochromic additives, however, are damaged by shorter-wavelength ultraviolet radiation, e.g., ultraviolet radiation of wavelengths less than about 320 nm. Fortunately, photoinitiators are available which are triggered at wavelengths of 350 nm and longer. Thus, according to a preferred embodiment of the invention, a colored-glass ultraviolet filter with a cutoff of 320 nm, such as those available from Corning Glass, is used to prevent exposure of the photochromic additive to ultraviolet light.

Ultraviolet curing can also be performed using a "blinking" ultraviolet light source. Curing with a blinking source may produce an optical segment with less variation in consistency.

Ultraviolet curing, unlike thermal curing, requires at least one ultraviolet-transparent surface through which the ultraviolet radiation can travel to reach the resin material. Although the lens preform provides one transparent surface, forming the mold from a ultraviolet-transmitting material, such as Crown glass, can provide an additional transparent surface.

Certain photochromic additives can absorb radiation at wavelengths desirable for curing the resin materials, reducing the effectiveness of the cure. Thus, it is desirable to avoid illuminating a resin to be cured through a layer containing such additives. Flexibility is available because the various assemblies of the invention can be illuminated through the lens preform, the mold or both. Where a resin containing a photochromic additive is to be cured, it is preferably illuminated from both sides to increase the rate of cure.

Other appropriate conditions for exposure will be apparent to those skilled in the art.

If the selected photochromic additive is heat stable, then thermal curing can be achieved by heating the resin material to a predetermined temperature for a predetermined time. Heat is preferably applied to the resin material by means of a heated fluid bath. Curing conditions typically include temperatures in the range of about 120 to 220 for periods of about 30 to 100 minutes. Preferred mold materials for use in connection with thermal curing include glass or metal.

Some materials can be cured by a combination of heat and ultraviolet light, either applied sequentially or simultaneously.

Although the above embodiments are discussed in connection with photochromic additives, these methods are also appropriate for use in connection with other additives such as, for example, antireflection coatings, anti-scratch coatings, and ultraviolet inhibitors.

Certain embodiments of the present invention are demonstrated by the following examples which are intended as illustrations and not as limiting the invention in any way.

What is claimed is:

1. A method for making photochromic composite plastic lenses, preforms or semifinished blanks comprising:

providing a finished or semifinished plastic lens, preform or semifinished blank having a bonding surface;

providing a mold having a molding surface, at least a portion of the molding surface having a profile substantially matching the bonding surface of the plastic lens, preform or semifinished blank;

providing an uncured resin that, upon curing, has a cross link density that is lower than that of said plastic lens, preform or semifinished blank and forms a soft matrix;

arranging the plastic lens, preform or semifinished blank, the uncured resin and the mold such that the uncured resin is disposed between the bonding surface of the plastic lens, preform or semifinished blank and the molding surface of the mold;

curing the uncured resin composition to form a composite plastic lens, preform or semifinished blank having a cured plastic attached portion that is bonded to the bonding surface of the plastic lens, preform or semifinished blank; and impregnating the cured plastic attached portion with a photochromic material.

2. The method of claim 1, wherein the plastic lens or semifinished blank comprises a material selected from the group consisting of bisphenol A polycarbonates, polycarbonates made from chloro, bromo, phenoxy and alkoxy substituted phenols or naphols and polymers of one or more monomers selected from the group consisting of aliphatic and aromatic acrylate monomers, urethane monomers, ester monomers, styrene monomers, vinyl monomers and allyl monomers.

3. The method of claim 2, wherein the uncured resin comprises from about 50 to about 98 weight % allyl monomers and about 2 to about 50 weight % of a component selected from the group consisting of one or more aliphatic and aromatic acrylate monomers, urethane monomers, ester monomers, styrene monomers, vinyl monomers, and allyl monomers.

4. The method of claim 2, wherein the uncured resin comprises about 65 to about 98 weight % allyl monomers and about 2 to about 35 weight % of a component selected from the group consisting of one or more aliphatic and aromatic acrylate monomers, urethane monomers, ester monomers, styrene monomers, vinyl monomers, and allyl monomers.

5. The method of claim 3, wherein the allyl monomers comprise a diallyl diglycol carbonate formulation.

6. The method of claim 1, wherein the cured plastic attached portion is a nonprescription carrier layer.

7. The method of claim 1, wherein the cured plastic attached portion comprises a non-prescription carrier layer region adjacent to a bifocal, trifocal, multifocal or progressive region that is spherical or aspheric in geometry.

8. The method of claim 1, wherein the photochromic additive is selected from the group consisting of pyrans and oxazoles.

9. The method of claim 1 wherein said bonding surface is a convex surface that is spherical or aspheric in geometry.

10. The method of claim 1 wherein said bonding surface is a concave surface that is spherical or aspheric in geometry.

11. The method of claim 1, wherein said cured plastic attached portion is overcoated with a hard, scratch resistant layer.

12. A method comprising:

providing a plastic optical substrate having a bonding surface;

providing a mold having a molding surface;

providing an uncured resin that, upon curing, has a cross link density that is lower than said plastic optical substrate and forms a soft matrix;

arranging the uncured resin, the optical substrate, and the mold such that the uncured resin is disposed between the bonding surface of the optical substrate and the molding surface of the mold;

curing the uncured resin composition such that said resin composition forms a soft matrix that is bonded to the bonding surface of the optical substrate; and impregnating the soft matrix with a photochromic material.

13. The method of claim 12, wherein said soft matrix is overcoated with a hard, scratch resistant layer.

14. A method comprising:

providing a plastic optical substrate having a bonding surface;

providing an uncured resin that, upon curing, has a lower cross link density than said plastic optical substrate;

arranging the uncured resin on the bonding surface of the optical substrate;

curing the uncured resin to form a matrix that is bonded to the bonding surface of the optical substrate; and impregnating the matrix with a photochromic material.

15. The method of claim 14, wherein said matrix is overcoated with a hard, scratch resistant layer.

16. A method for making photochromatic composite plastic lenses, preforms or semifinished blanks comprising:

providing a finished or semifinished plastic lens, preform or semifinished blank having a bonding surface;

providing an uncured resin that, upon curing, has a cross link density that is lower than said plastic lens, preform or semifinished blank and forms a soft matrix;

arranging the uncured resin on said bonding surface;

curing the uncured resin to form a matrix that is bonded to the bonding surface;

impregnating the matrix with a photochromic material to form a photochromic layer; and providing an outer resin layer having a high crosslink density after cure on said photochromic layer.

* * * * *

UNITED STATES PATENT AND TRADEMARK OFFICE
CERTIFICATE OF CORRECTION

PATENT NO. : 5,531,940  
DATED : 2 July 1996  
INVENTOR(S) : Amitava GUPTA et al.

Page 1 of 2

It is certified that error appears in the above-indentified patent and that said Letters Patent is hereby corrected as shown below:

IN THE ABSTRACT, line 3: After "resin" delete "is".

| Column | Line | |
|---|---|---|
| 4 | 54 | Change "lyphenyl" to --lylphenyl--. |
| 4 | 60 | Change "naphols;" to --naphthols;--. |
| 5 | 53 | Change "(on" to --(or--. |
| 5 | 56 | Change "molds" to --mold--. |
| 7 | 15 | Change "preform" to --preforms--. |
| 7 | 38 | Before "ultra-" change "a" to --an--. |
| 7 | 52 | After "about" insert --25--; after "to" insert --75--. |
| 7 | 53 | Change "weigh" to --weight--. |
| 7 | 64 | After "and" insert --25 to 75--. |

UNITED STATES PATENT AND TRADEMARK OFFICE
CERTIFICATE OF CORRECTION

PATENT NO. : 5,531,940
DATED : 2 July 1996
INVENTOR(S) : Amitava GUPTA et al.

It is certified that error appears in the above-indentified patent and that said Letters Patent is hereby corrected as shown below:

| Column | Line | |
|---|---|---|
| 8 | 59 | Before "arranged" delete "are". |
| 10 | 64 | After "materials" insert --in--. |
| 10 | 65 | Change "is" to --are--. |
| 11 | 10 | Change "a" to --an--. |
| 11 | 14 | Before "ultraviolet" change "a" to --an--. |
| 11 | 35 | Before "ultraviolet" change "a" to --an--. |
| 12 | 30 | Change "naphols" to --naphthols--. |

Signed and Sealed this

First Day of July, 1997

Attest:

BRUCE LEHMAN

Attesting Officer

Commissioner of Patents and Trademarks